(12) United States Patent
Webster et al.

(10) Patent No.: US 6,535,554 B1
(45) Date of Patent: Mar. 18, 2003

(54) PCS SIGNAL SEPARATION IN A ONE DIMENSIONAL CHANNEL

(75) Inventors: Mark A. Webster, Palm Bay, FL (US); Steven D. Halford, Palm Bay, FL (US)

(73) Assignee: Harris Corporation, Melbourne, FL (US)

(*) Notice: Subject to any disclaimer, the term of this patent is extended or adjusted under 35 U.S.C. 154(b) by 0 days.

(21) Appl. No.: 09/193,256

(22) Filed: Nov. 17, 1998

(51) Int. Cl.[7] ................................................. H03H 7/40
(52) U.S. Cl. ....................... 375/233; 375/234; 375/262; 375/264; 375/341; 375/348; 375/350; 708/323; 714/794; 714/795; 333/28 R
(58) Field of Search ................................. 375/230, 233, 375/234, 262, 264, 341, 348, 350; 708/322, 323; 714/794, 795; 333/18, 28 R (56) References Cited

U.S. PATENT DOCUMENTS

| | | | |
|---|---|---|---|
| 4,833,693 A | | 5/1989 | Eyuboglu |
| 5,031,194 A | * | 7/1991 | Crespo et al. ................. 375/14 |
| 5,031,195 A | * | 7/1991 | Chevillat et al. .............. 375/14 |
| 5,056,117 A | | 10/1991 | Gitlin et al. |
| 5,150,379 A | | 9/1992 | Baugh et al. |
| 5,263,033 A | | 11/1993 | Seshadri |
| 5,303,263 A | | 4/1994 | Shoji et al. |
| 5,345,476 A | | 9/1994 | Tsujimoto |
| 5,465,276 A | | 11/1995 | Larsson et al. |
| 5,561,687 A | | 10/1996 | Turner |
| 5,619,167 A | | 4/1997 | Adachi |
| 5,692,011 A | * | 11/1997 | Nobakht et al. ............ 375/233 |
| 5,694,424 A | * | 12/1997 | Ariyavisitakul ............ 375/233 |
| 5,822,143 A | * | 10/1998 | Cloke et al. .................. 360/65 |
| 6,035,006 A | * | 3/2000 | Matui ......................... 375/340 |

OTHER PUBLICATIONS

Jianjun Wu and A. Hamid Aghvami, "A New Adaptive Equalizer with Channel Estimator for Mobile Radio Communications," *IEEE Trans. on Vehicular. Tech.*, vol. 45, pp. 467–474, Aug. 1996.

P. Ranta, A. Hottinen, and Z. Honkasalo, "Co–Channel Interference Cancellation Receiver for TDMA Mobile Systems," *ICC '95*, pp. 17–21.

* cited by examiner

Primary Examiner—Stephen Chin
Assistant Examiner—Dac V. Ha
(74) Attorney, Agent, or Firm—Duane Morris LLP (57) ABSTRACT

A method and apparatus for detecting and decoding multiple or single users in a TDMA system where multipath propagation is present. A TDMA receiver may receive a one dimensional TDMA signal stream and may include a maximum likelihood sequence estimation (MLSE) stage to detect users from the received one dimensional TDMA signal stream. A decision feedback equalizer receives the postcursor portions of the TDMA channel from a channel estimator and an estimate of the postcursor portions of the transmitted signal from the MLSE stage. The decision feedback equalizer (DFE) truncates the interference in the received TDMA signal stream by cancelling the postcursor portion of the channel. The MLSE stage operates on the truncated TDMA signal stream to detect users.

29 Claims, 8 Drawing Sheets

PCS SIGNAL SEPARATION IN A ONE DIMENSIONAL CHANNEL

BACKGROUND OF THE INVENTION

The present invention relates to wireless communications, more specifically, to a method and apparatus for detecting users at a time division multiple access ("TDMA") receiver.

Prior art TDMA cellular/personal communications system ("PCS") receivers generally include a series of processing stages for exploiting the features of a one dimensional signal stream such as the output signal of a single analog to digital converter.

Figure 1:
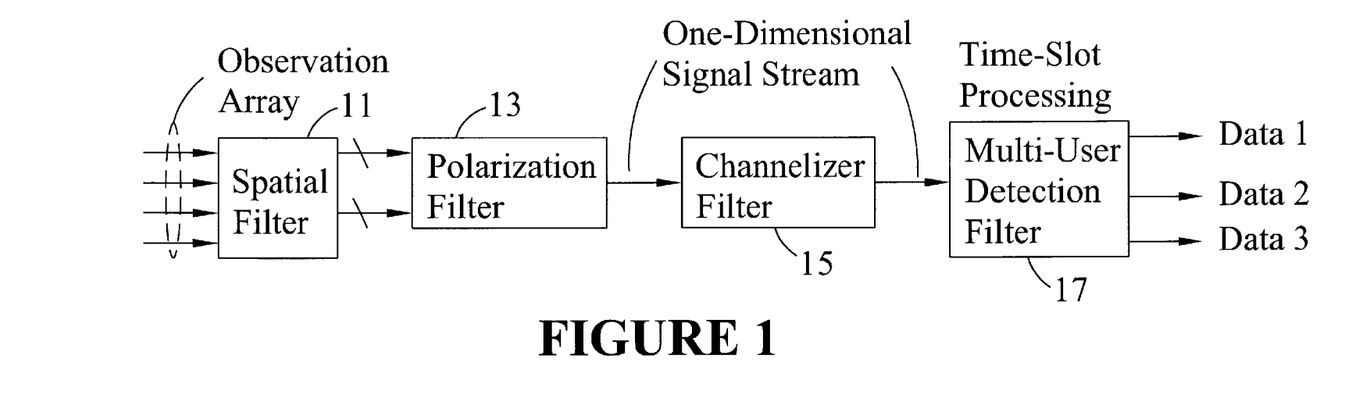
FIG. 1 is a functional block diagram illustrating the processing stages of a prior art TDMA receiver.
Figure 2:
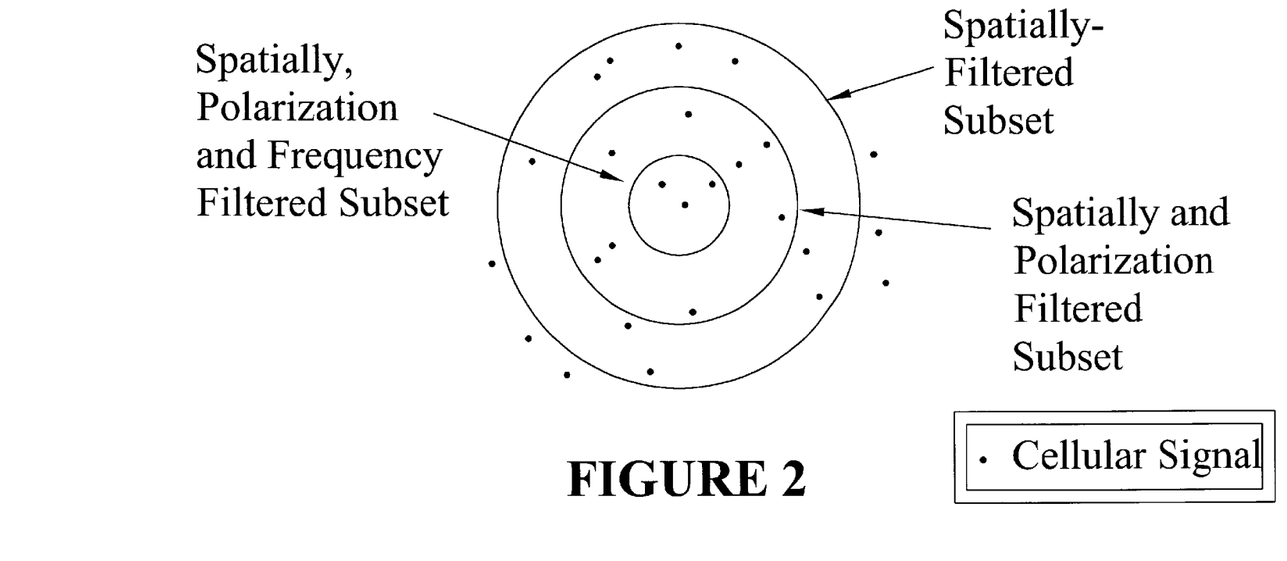
FIG. 2 is a concentric signal-filter plot illustrating an example of spacial, polarized, and frequency filtered subsets of cellular signals received by the prior art TDMA receiver of FIG. 1.

With reference to FIG. 1, a receiver may include in its processing stages a spatial filter 11, a polarization filter 13, a channelizer filter 15, and a multi-user detection filter 17. Each stage acts as a user-population filter to separate the users in the receive environment based on polarization, spatial, and frequency characteristics as illustrated by the concentric subsets shown in FIG. 2.

The performance of each stage is a factor in designing a workable receiver architecture. Cost and complexity are dominant features. Frequently, receiver design is also constrained by the number of available observation array elements due to limited access to the geographic areas selected for deploying antenna assets.

Multi-user detection is the last stage of the receiver. A one-dimensional channelized signal stream which contains a cluster of cochannel signals is fed to the last stage. The signal stream may be TDMA-staggered (e.g., GSM, IS-54, IS-136) but contains multiple signals within a common time-slot.

In dense wireless environments, cochannel interference and intersymbol interference are significant problems for the detection of multiple users. Improving the performance of the last stage in detecting users may simplify the processing burden on preceding stages.

Generally, cochannel interference is caused by a multitude of other signals impinging upon the communication receiver. For TDMA systems, numerous techniques exist for cancelling cochannel interference. One known cancellation technique attempts to eliminate interference through a filtering process using the demodulation-remodulation technique and another method uses the cyclostationary signal processing technique.

The demod-remod technique uses successive stages of cancellation to eliminate one signal at a time. One problem with this technique is that signals must be widely spaced in power from each other or the error-rate is too high to perform effective remodulation/cancellation. Acquisition time may also be an issue because of the time needed to allow each stage to pull in.

Under certain conditions cyclostationary signal processing known as frequency-shift filtering ("FRESH") can be used to separate interfering signals. The disadvantages of FRESH are that the symbol rates and carrier-frequencies must be distinct, i.e., the frequencies must be known with high accuracy and the channel transfer function must be known for each signal. Finally, the pulsed nature of TDMA is not very amenable to the FRESH architecture.

Another known cancellation technique does not attempt to eliminate the interference, but jointly detects all signals simultaneously. Joint maximum likelihood sequence estimation ("JMLSE") is an example of a joint detection technique.

JMLSE is known in the art to be the highest performing technique for removing co-channel interference. JMLSE directly embraces the signaling probability functions and is capable of exploiting carrier-frequency and symbol-rate differences. However, the main drawback of JMLSE is its complexity.

Intersymbol interference ("ISI"), also known as multipath interference, as opposed to cochannel interference is generally caused by multiple signal propagation paths. These multiple paths result from the signal being scattered by a myriad of objects prior to reaching the receiver. The resulting interference is a form of self-interference which lowers the performance of the system.

Modern communication theory has devised multiple techniques for combating ISI-induced performance loss. In sequential order of best-to-worst performance, they are: the matched-filter bound technique, the maximum likelihood sequence estimator (MLSE), the decision feedback equalizer ("DFE") and the linear equalizer.

DFE's may be either fractionally-spaced or symbol-spaced, where the fractionally-spaced equalizer is higher performing. DFE operation is often several dB better than a linear equalizer which may amplify noise when channel nulls are present.

The matched-filter bound technique is not practical in application, because isolated pulses are sent at a relatively-slow symbol rate.

The MLSE receiver is theoretically the top-performing technique. However, MLSE is usually too complex to be used in many applications. Nevertheless, most TDMA cellular receivers use MLSE because the multipath spread usually only extends across a few symbols.

Figure 3:
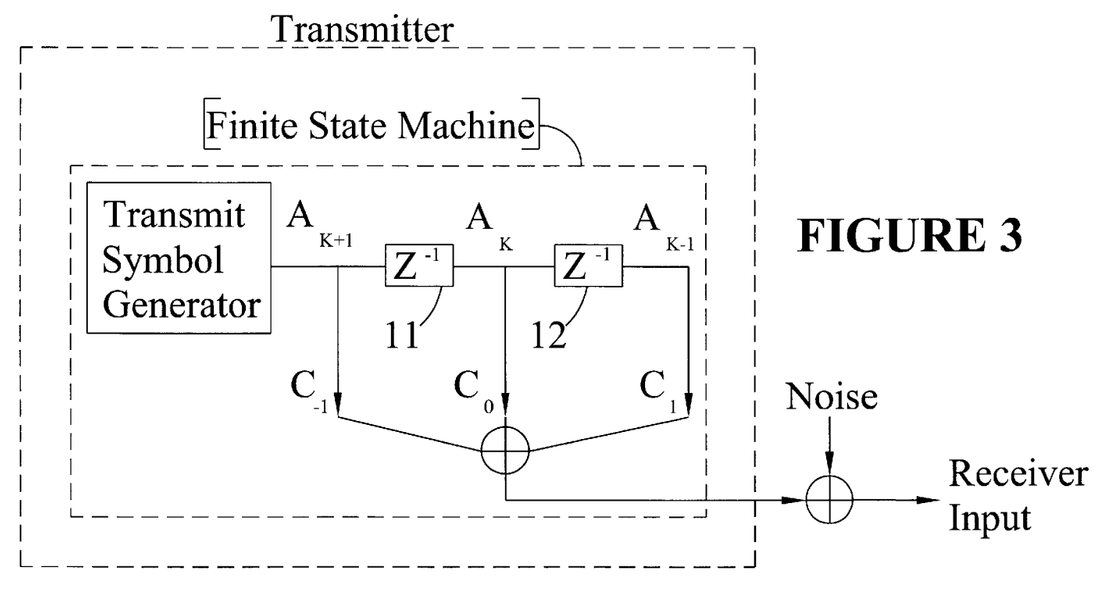
FIG. 3 is a functional block diagram illustrating a channel memory effect on a signal in a TDMA system.
Figure 4:
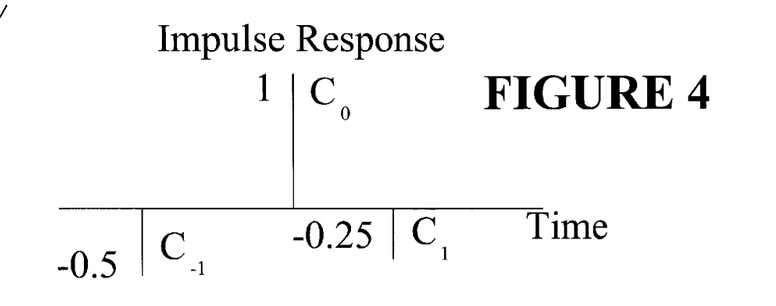
FIG. 4 is a signal versus time graph illustrating the channel impulse response of FIG. 3.

In systems employing an MLSE receiver, a transmitter 10 such as shown in FIG. 3 may generate a 3-tap channel 4-ary pulse-amplitude-modulation ("PAM") signal with a transmit symbol $A_k$ at time k taken from the signal set $\{-3, -1, 1, 3\}$. The noise-free signal arriving at the receiver can be represented by a finite state machine ("FSM") as shown in FIG. 4. Since there are only two delay registers 11 and 12, the FSM only remembers the last two inputs, $A_k$ and $A_{k-1}$ ($A_k$, $A_{k-1}$) which define the state. The channel transfer function for this example is:

$$H(z) = -0.5 + z^{-1} - 0.25z^{-2} \qquad (1)$$

Figure 5:
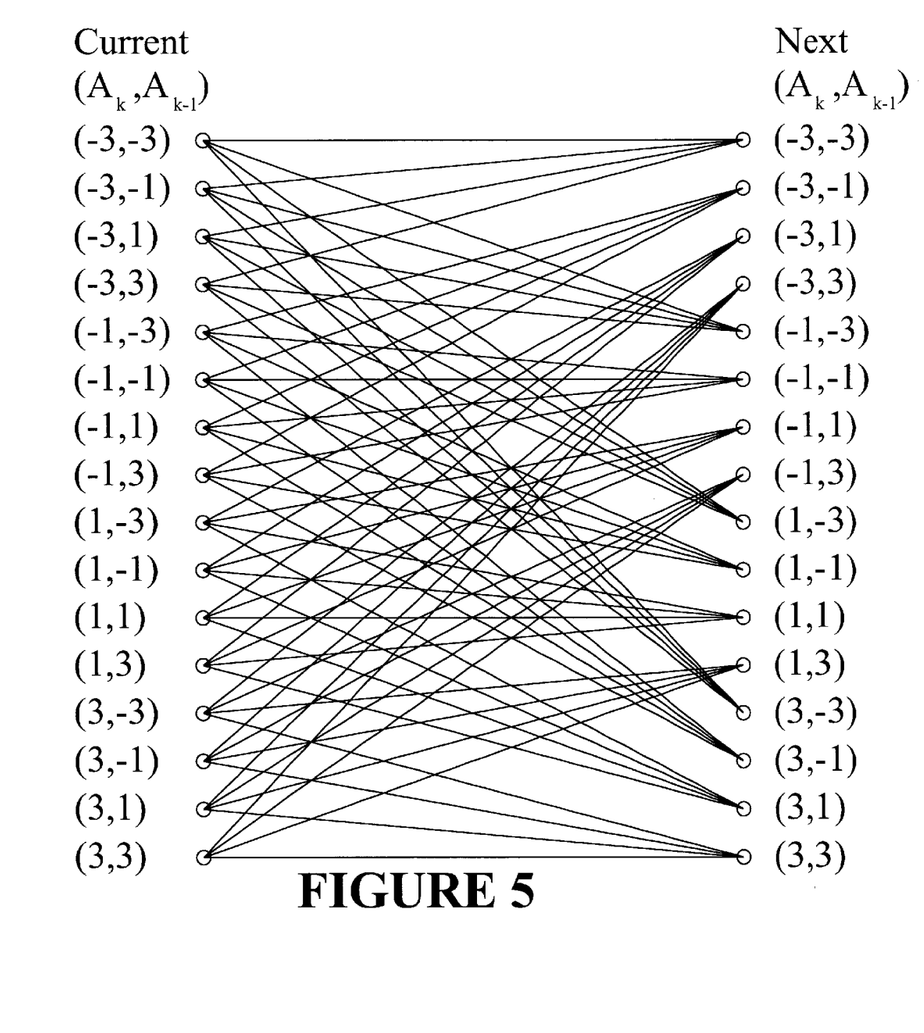
FIG. 5 is a state trellis diagram illustrating the trellis for the receiver of the TDMA system of FIG. 3.

Given a new input $A_{k+1}$, a new output voltage is generated and a new state results as shown in FIG. 5. The output voltage and new state are a function of the current state and the new input. Since the new input $A_{k+1}$ can be one of four values, each state has four exiting branches.

Generally, given an M-ary constellation with an (L+1)-tap channel, the number of states is equal to $M^L$, and the number of branches entering and exiting each state is M.

For each noisy received sample, $M*(M^L)$ many branch metrics are computed and added to the preceding state metric. All branches entering the output state are eliminated except for the one corresponding to the minimum cumulative distance metric. The output state with the best (i.e., smallest) metric is used to make a symbol decision by tracing back into the trellis a certain depth (the "traceback depth"). The traceback depth is usually about five times the channel length.

Therefore, the complexity is roughly proportional to $M^L$. The complexity can become prohibitively large for implementation with high-dimensional modulations where M is large (e.g., M=16) and channel impulse responses which are long (e.g., L=8). Thus, both the storage demands and the operation complexity may become unmanageable.

It is object of the present invention to provide a novel joint MLSE/DFE technique for user detection in a TDMA system.

It is yet another object of the present invention to provide a novel method and apparatus for detecting multiple users in a TDMA system with an MLSE operating on a signal stream having a cancelled postcursor portion.

These and many other objects and advantages of the present invention will be readily apparent to one skilled in the art to which the invention pertains from a perusal of the claims when read in connection with the appended drawings, and the following detailed description of the preferred embodiments.

DESCRIPTION OF PREFERRED EMBODIMENTS

Figure 6:
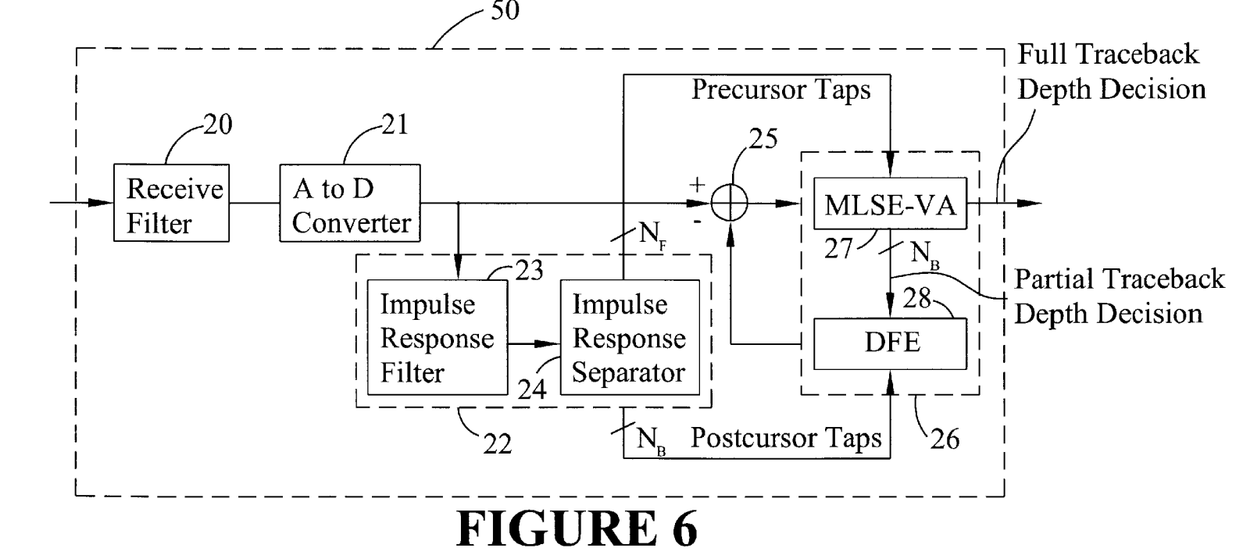
FIG. 6 is a functional block diagram illustrating one embodiment of the user-detector of the present invention.
Figure 7:
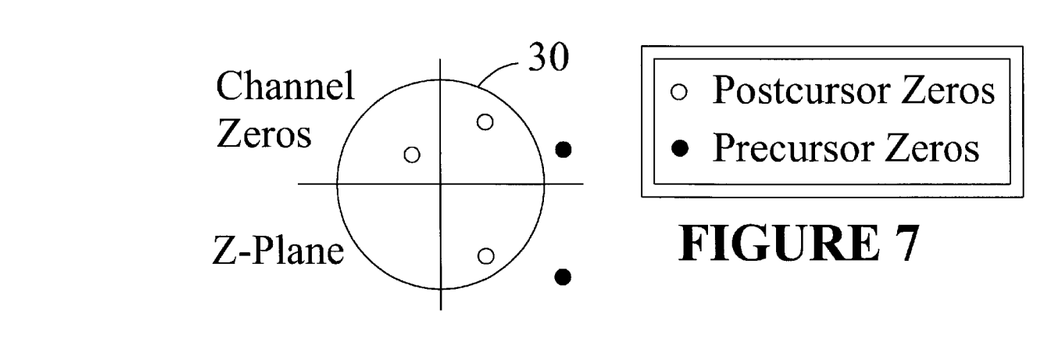
FIG. 7 is a signal-filter plot illustrating postcursor and precursor separation of a TDMA signal for the embodiment of FIG. 6.

With reference now FIG. 6, a single user detector 50 includes a receive filter 20, an analog-to-digital converter 21, a channel estimator 22, a joint MLSE/DFE stage 26, and a combiner 25. The joint MLSE/DFE stage 26 includes an MLSE-VA stage 27 and a DFE filter 28.

In operation, a signal stream may be received at the receiver filter 20. The receiver filter 20 may perform noise limiting and bandwidth limiting operation on the signal stream. The receive filter 20 may provide the filtered signal to the analog-to-digital converter 21. The analog-to-digital converter 21 may perform an analog-to-digital signal conversion and provide a digital signal to the channel estimator 22 and the combiner 25. The channel estimator 22 may include an impulse response filter 23 and an impulse response separator 24. The impulse response filter 23 provides the end-to-end channel impulse response.

Figure 8:
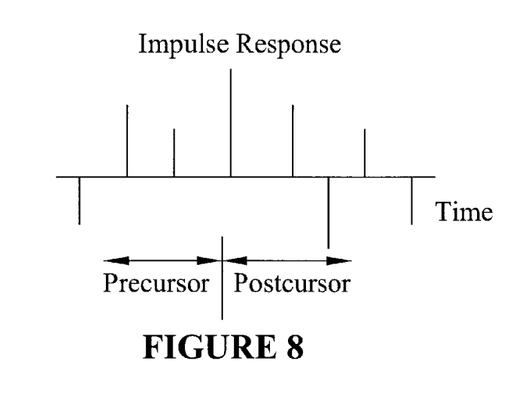
FIG. 8 is a graph illustrating the impulse response of a TDMA signal.

The impulse response calculator separates the impulse response estimate into a precursor and postcursor portion. Generally, and as shown in FIG. 8, channel taps following the largest tap are the postcursor components, while taps preceding the largest tap are the precursor components. The impulse response separation may decompose the signal into precursor and postcursor components by detecting the largest tap. However, separating the channel impulse response based on the largest tap is not required.

The channel estimator 22 may provide the postcursor and precursor portions of a signal stream to the joint MLSE-VA 26. The MLSE-VA 27 estimates a likely symbol from the precursor portion using full traceback depth decision and provides an estimate of the postcursor portion to the DFE 28 using partial traceback depth decisions. The DFE 28 may receive the postcursor portion from the channel estimator 22 and the estimate of the postcursor portion from the MLSE-VA 27. The DFE 28 provides a signal to the combiner 25 for truncating the signal stream. The MLSE-VA 27 estimates a likely symbol sequence from the truncated channel impulse response using full traceback depth decisions. The DFE-truncated signal stream is simpler for the MLSE-VA to process for user detection. For an M-ary modulation with a channel postcursor response of $N_B$ taps, the overall complexity of the MLSE-VA user detector of the receiver is reduced by a factor $M^{NB}$.

The 4-ary PAM and a 3-tap channel system of FIG. 3 may illustrate the reduction in complexity. The roots of the channel transfer function (1) are computed:

$$H(z) = -0.5 + z^{-1} - 0.25 z^{-2} = -0.5 z^{-1}(z - 0.29289)(z - 1.7071). \qquad (2)$$

The first zero (z=0) is a phase shift. The second zero (z=0.29289) is a postcursor. The third zero (z=1.7071) is a precursor.

Figure 9:
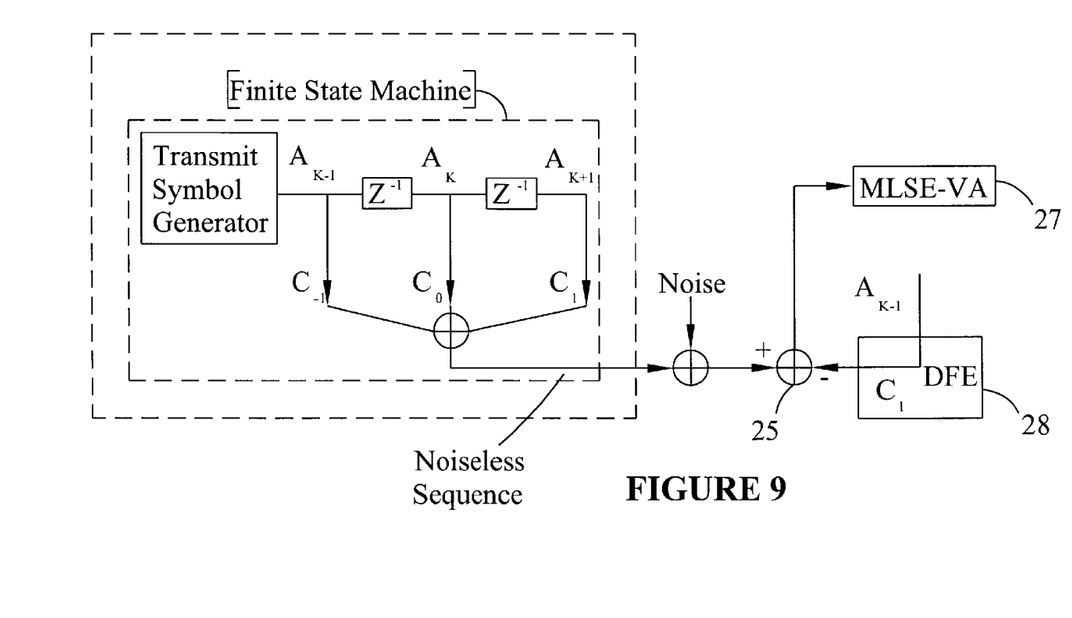
FIG. 9 is a simplified functional block diagram of FIG. 6 in a communication system where the signal sequence is noiseless.

The system of FIG. 3 with a receiver having the user detector of FIG. 6 simplifies to the system of FIG. 9. With reference to FIG. 9, the DFE 28 operates on the only postcursor component of the channel $c_1$ and an estimate of the postcursor component $A_{k-1}$ from the MLSE-VA 27. The rest of the channel components may be used to form a new finite-state-machine with a simplified MLSE trellis.

Figure 10:
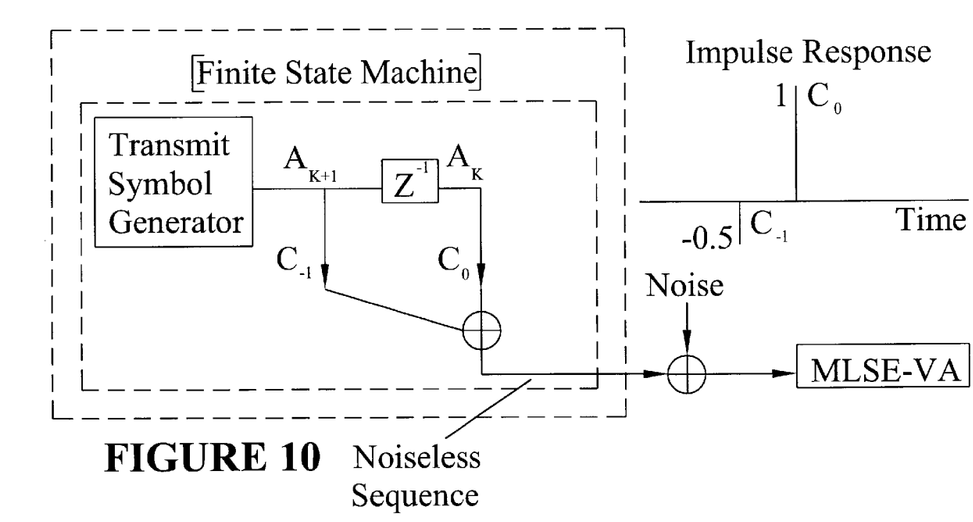
FIG. 10 is a simplified functional block diagram of FIG. 9 where the postcursor is cancelled.

The system of FIG. 9 may be simplified for illustration to the system of FIG. 10. With reference to FIG. 10, the channel impulse response is only two taps long ($c_0$ and $c_{-1}$) Consequently, the number of states in the Viterbi trellis is four as shown in FIG. 11, instead of 16 (see FIG. 5).

Figure 11:
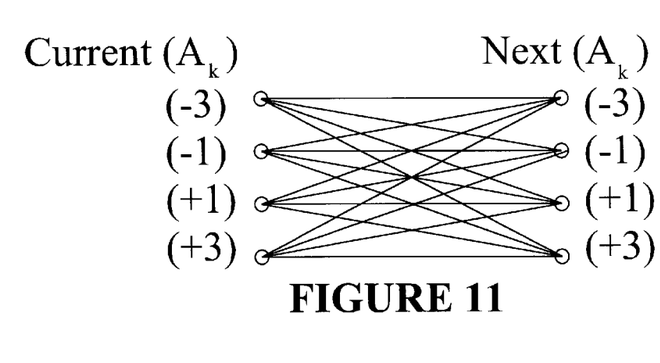
FIG. 11 is a simplified state trellis diagram of the state trellis of FIG. 5.

A comparison of the four state trellis of FIG. 11 with the sixteen state trellis of FIG. 5 illustrates the great reduction in complexity. The complexity has been reduced by a factor of four. In a multi-user system the complexity may be reduced by a factor of 100 or more.

Figures 12, 13:
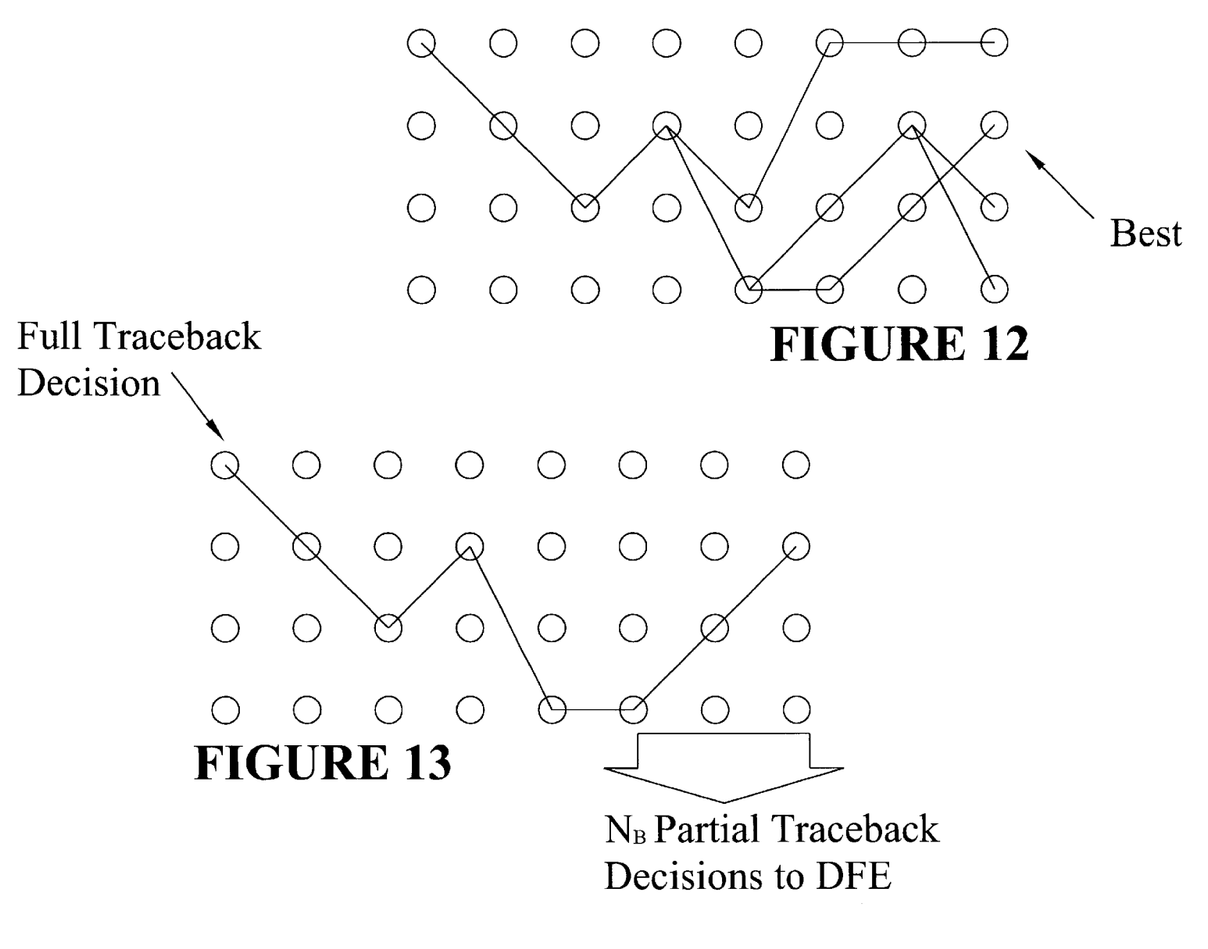
FIG. 12 is a path metrics diagram illustrating state metrics links for an MLSE-VA stage.
FIG. 13 is a path metrics diagram illustrating the path decision metrics of an embodiment of the present invention.

In operation, the MLSE-VA of FIG. 6 may have state metric links illustrated in FIG. 12. Branch metrics are computed after each receive sample arrives and the best cumulative branch metric is retained for each new output state. The best (lowest) metric then identifies the highest-probable transmit-symbol-sequence.

With reference to FIG. 13, the DFE 28 cannot function with decision delays, so the closest $N_B$ decisions identified by the traceback path of the MLSE-VA 27 are loaded in the DFE 28. If these partial traceback decisions are correct, the postcursor component is eliminated. If a partial traceback decision is wrong, a DFE-induced noise burst occurs which the full traceback decision may correct. High performance is realized because maximum-likelihood decisions are used in all cases.

Channel impulse response is important for user detection. To identify the channel impulse response, TDMA cellular type signals are designed with overhead patterns.

For example, GSM uses eight different midamble sequences, each having impulsive autocorrelation properties over a span of 11 lags. One of the eight sequences is allocated to a user corresponding to their time-slot within a frame. The receiver correlates the received signal with the known midamble pattern to derive a channel estimate.

Figure 14:
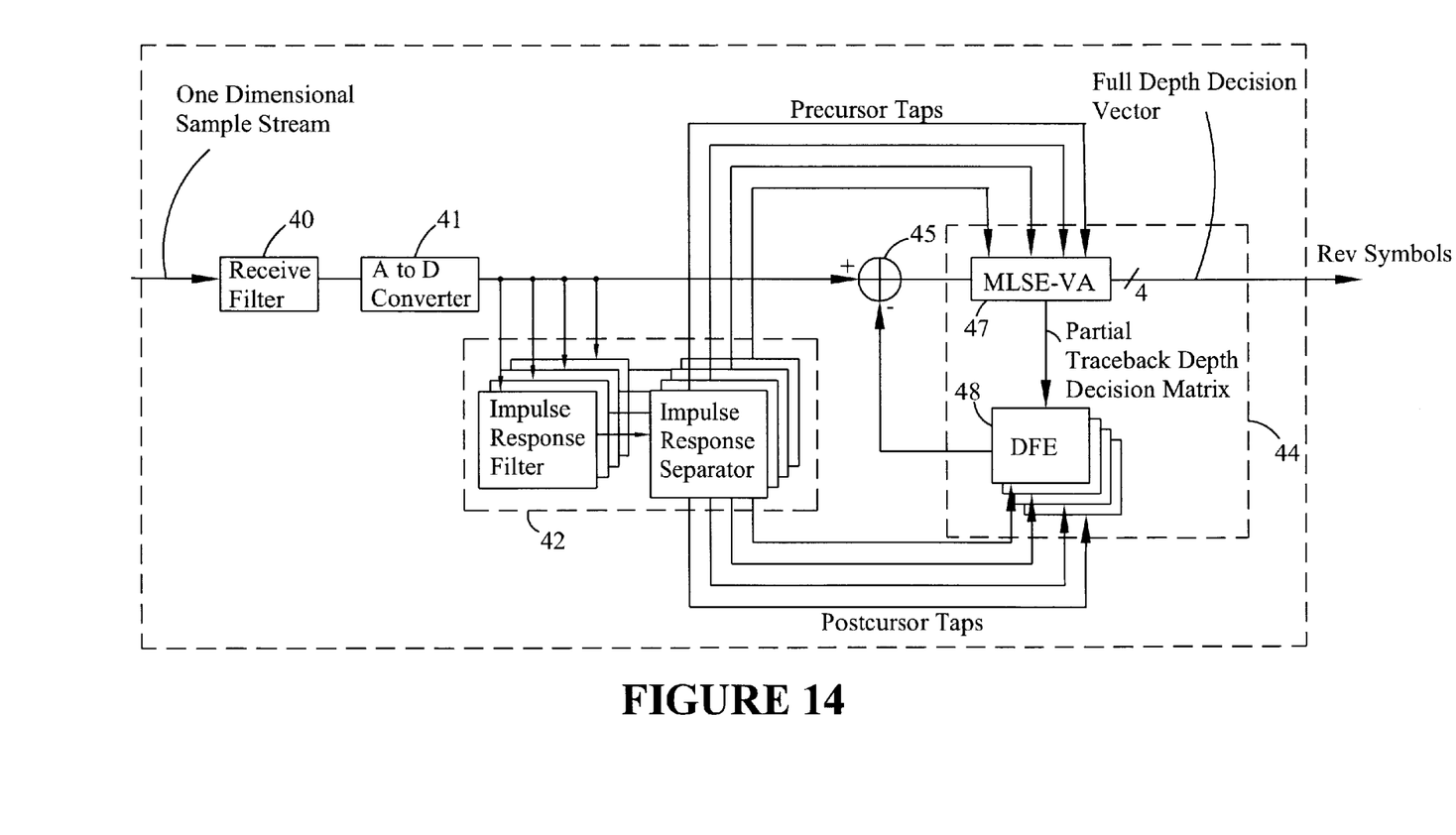
FIG. 14 is a functional block diagram illustrating a second embodiment of the user-detector of the present invention.

With reference to FIG. 14, a multi-user detector 70 includes a receive filter 40, an analog-to-digital converter 41, plural channel estimators 42, a joint MLSE/DFE stage 44, and a combiner 45. The joint MLSE/DFE stage 44 includes an MLSE-VA stage 47 and a DFE filter 48.

An advantage of the multi-user technique is that the end-to-end multi-channel impulse response contains a natural form of waveform coding (e.q., a unique multipath profile, time-of-arrival (TOA), amplitude level, and carrier phase).

In operation, the channel estimators 42 may jointly estimate the number of users and associated channels using correlated waveform training sequences and other signal features. Initially, the multiple DFE's 48 are set to a zero-data state. The impulse response separator 43 in each of the channel estimators may decompose each channel into postcursor and precursor portions. The postcursor portions are loaded into the multiple DFE's 48. The precursor portions are loaded into the MLSE-VA 47. The MLSE-VA 47 constructs a new trellis representing the reduced complexity multi-user finite state machine. The MLSE-VA 47 may detect multiple users from a received signal sample. The multiple DFE's 48 are updated by a partial traceback decisions of the MLSE-VA 47. The combiner 45 truncates the incoming signal by subtracting the output of the multiple DFE's 48 from the signal stream.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A user detector for a time divided signal communications system comprising:
   a receive filter for providing a pulse sequence derived from a modulated time divided signal;
   a channel estimator responsive to said receive filter for estimating time divisions of the pulse sequence;
   a separator responsive to said channel estimator for separating-pulses in the time divisions into postcursor and precursor portions;
   a canceler responsive to a maximum likelihood sequence estimator and said separator for cancelling postcursor portions from the pulse sequence; and
   a maximum likelihood sequence estimator responsive to said separator, said receive filter, and said canceler for estimating a likely sequence of time divisions over a period of time as a function of the pulse sequence having cancelled postcursor portions and estimating postcursor portions.

2. The user detector of claim 1 wherein said channel estimator estimates L pulses per time division for a 4-ary pulse amplitude-phase modulated signal, wherein L is necessarily an integer.

3. The user detector of claim 1 wherein said receiver filter provides a pulse sequence derived from a pulse amplitude-phase modulated signal with L pulses per channel, wherein L is necessarily an integer.

4. The user detector of claim 1 wherein said channel estimator estimates time divisions of the pulse sequence from an overhead pattern designed into the modulated time divided signal.

5. The user detector of claim 1 wherein said channel estimator estimates time divisions of the pulse sequence from a midamble sequence designed into the modulated time divided signal.

6. The user detector of claim 1 wherein said channel estimator estimates a time division o the pulse sequence as a function of the natural waveform coding of the time divided signals.

7. The user detector of claim 1 wherein said maximum likelihood sequence estimator estimates the postcursor portions from partial traceback decisions.

8. The user detector of claim 1 wherein the channel estimator estimates a plurality of time divisions in parallel.

9. The user detector of claim 8 further comprising a plurality of separators and a plurality of cancelers for operating on the plurality of time divisions estimated in parallel by the said channel estimator.

10. The user detector of claim 8 wherein said canceler, said separator, and said maximum likelihood sequence estimator operate in parallel on the plurality of time divisions.

11. The user detector of claim 1 wherein said separator separates L pulses per time divisions into a postcursor portion of M pulses and a precursor portion of N pulses where L=M+N, wherein L, M, and N are necessarily integers.

12. A time division multiple access (TDMA) receiver of the type having a maximum likelihood sequence estimator for detecting channels in a TDMA signal using a received pulse sequence, the improvement comprising an apparatus for reducing processing complexity of the maximum likelihood sequence estimator by canceling the postcursor portion of the received pulse sequence before the received pulse sequence is operated on by said maximum likelihood sequence estimator, wherein said apparatus further comprising an impulse response separator for decomposing the TDMA signal into the postcursor portion and a precursor portion.

13. The TDMA receiver of claim 12 wherein said apparatus comprises a decision feedback equalizer responsive to said maximum likelihood sequence estimator for cancelling the postcursor portion of the received pulse sequence as function maximum likelihood sequence estimator estimates.

14. The TDMA receiver of claim 13 wherein said decision feedback equalizer is adapted to receive traceback sequence estimates from said maximum likelihood sequence estimator.

15. The TDMA receiver of claim 13 wherein said maxim likelihood sequence estimator updating said decision feedback equalizer with partial traceback sequence estimates.

16. The TDMA receiver of claim 13 having more than one differential feedback equalizer providing parallel operation on the received pulse sequence.

17. A method of decoding a multilevel pulse amplitude-phase modulated signal in a time division multiple access system comprising the steps of:
   (a) dividing a signal division into precursor and postcursor portions;
   (b) estimating symbol state from the precursor portion;
   (c) updating the postcursor portion as a function of the symbol state estimate; and
   (d) cancelling the postcursor portion of a next incoming signal division as a function of the updated postcursor portion.

18. The method of claim 17 further comprising the steps of:
   (a) receiving the multilevel pulse amplitude-phase modulated signal;
   (b) demodulating the multilevel pulse amplitude-phase modulated signal to provide a pulse sequence; and
   (c) estimating the signal division from the pulse sequence.

19. The method of claim 18 wherein the step of receiving the multilevel pulse amplitude-phase modulated signal includes the step of receiving a 4-ary pulse amplitude-phase signal.

20. The method of claim 18 wherein the signal division is estimated from the pulse sequence from an overhead pattern designed into the pulse sequence.

21. The method of claim 17 wherein the step of estimating symbol state comprises the step of providing a maximum likelihood sequence estimator for estimating a likely symbol state sequence.

22. The method of claim 17 wherein the symbol state estimate used for updating the postcursor portion is based on a partial traceback.

23. The method of claim 17 wherein the step of dividing a signal division includes the step of providing an impulse response separator for dividing the signal division into precursor and postcursor portions.

24. The method of claim 17 further comprising the steps of estimating a series of signal divisions from a pulse sequence and for each of the signal divisions, repeating the steps of estimating symbol state, updating the postcursor portion, and cancelling the postcursor portion.

25. The method of claim 17 wherein the steps of estimating symbol state, updating the postcursor portion, and cancelling the postcursor portion are repeated in parallel.

26. A method of detecting user channels in a time division multiple access (TDMA) system comprising the steps of:
   (a) estimating a channel associated with a user from an incoming channel signal sample;
   (b) decomposing the channel into a postcursor portion and a precursor portion;
   (c) loading the postcursor portion in a decision feedback equalizer for feedback;
   (d) estimating a likely symbol from the precursor portion using a maximum likelihood sequence estimator;
   (e) updating the postcursor portion in the decision feedback equalizer using the likely symbol estimated by said maximum likelihood sequence estimator; and
   (f) subtracting a next arriving channel signal simple with the updated postcursor potion in said decision feedback equalizer.

27. The method of claim 26 wherein the step of decomposing the channel comprises providing an impulse response separator.

28. The method of claim 26 wherein the step of estimating a channel includes the step of identifying an overhead pattern designed into the incoming channel signal sample.

29. The method of claim 26 wherein the step of estimating a channel includes the step of identifying natural channel coding of a channel.

\* \* \* \* \*